United States Patent
Mittal et al.

(10) Patent No.: US 9,471,634 B2
(45) Date of Patent: Oct. 18, 2016

(54) EXECUTION OF NEGATED CONDITIONS USING A BITMAP

(71) Applicants: Kaushal Mittal, Dublin, CA (US); Mahendra Chavan, Pune, IN (US)

(72) Inventors: Kaushal Mittal, Dublin, CA (US); Mahendra Chavan, Pune, IN (US)

(73) Assignee: Sybase, Inc., Dublin, CA (US)

( * ) Notice: Subject to any disclaimer, the term of this patent is extended or adjusted under 35 U.S.C. 154(b) by 218 days.

(21) Appl. No.: 14/206,531

(22) Filed: Mar. 12, 2014

(65) Prior Publication Data

US 2015/0261821 A1    Sep. 17, 2015

(51) Int. Cl.
*G06F 17/30* (2006.01)

(52) U.S. Cl.
CPC ... *G06F 17/30469* (2013.01); *G06F 17/30324* (2013.01); *G06F 17/30463* (2013.01); *G06F 17/30483* (2013.01)

(58) Field of Classification Search
CPC .................. G06F 17/30469; G06F 17/30466; G06F 17/30463; G06F 17/30442
USPC .................................................. 707/713–715
See application file for complete search history.

(56) References Cited

U.S. PATENT DOCUMENTS

| | | | |
|---|---|---|---|
| 2006/0248592 A1* | 11/2006 | Agrawal | G06F 21/6245 726/26 |
| 2009/0198736 A1* | 8/2009 | Shen | G06F 17/30339 |
| 2010/0169381 A1* | 7/2010 | Faunce | G06F 17/30448 707/797 |
| 2012/0078880 A1* | 3/2012 | Kirk | G06F 17/30498 707/719 |

OTHER PUBLICATIONS

Visual Studio, Boolean Operators (F#), Microsoft 2013.*
Chris Fehily, SQL Visual QuickStart Guide: Retrieving Data from a Table, Jan. 5, 2009, Peachpit, p. 1-34.*

* cited by examiner

*Primary Examiner* — Thu-Nguyet Le
(74) *Attorney, Agent, or Firm* — Sterne, Kessler, Goldstein & Fox PLLC

(57) ABSTRACT

Disclosed herein are system, method, and computer program product embodiments for accelerating database queries containing bitmap-based conditions. An embodiment operates by determining a bitmap, where the bitmap represents a set of rows that have satisfied a conjunct that precedes a negated condition in a query expression and restricting the evaluation of the negated condition to the set of rows represented by the bitmap.

20 Claims, 7 Drawing Sheets

EXECUTION OF NEGATED CONDITIONS USING A BITMAP

BACKGROUND

Databases commonly organize data in the form of tables, each table having a number of rows and columns. Each row in a table generally has a data value associated with each of the columns, this intersection of rows and columns commonly called a cell. A system needing access to data in the database typically issues a request in the form of a query. A query usually involves a request for the data contained in one or more cells of any rows which satisfy a particular condition. This condition often involves the comparison of the values of cells in a column to some other value to determine whether the row associated with the compared cell satisfies the condition.

A direct comparison of each cell of interest in a table to a value is often computationally expensive, and database developers have accordingly introduced means by which rows satisfying a comparison operation can be more readily determined without the need to traverse every row of a table. A common improvement involves the use of a tree-based index structure to determine which rows contain a desired value. Each node of the tree represents a distinct value appearing within a particular column in any row of the table. Each node of the tree connects to a data structure representing the set of rows in the table where the indexed column contains the specified distinct value. One such data structure that can be used to represent a set of rows is a bitmap, where each bit with a '1' value within the bitmap corresponds to a row containing the specified distinct value. The rows for which the value of the particular column is satisfied would be represented by "set" bits in the bitmap (i.e., bits set to either a '1' or a '0' value in order to indicate that a corresponding row satisfies the condition or fails to satisfy it).

Bitmap-based conditions are used for accelerating database queries. More specifically bitmaps are used, for example, for restricting evaluation of a disjunct within a disjunction. However, bitmap-based conditions are not used for negated conditions for further accelerating database queries.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
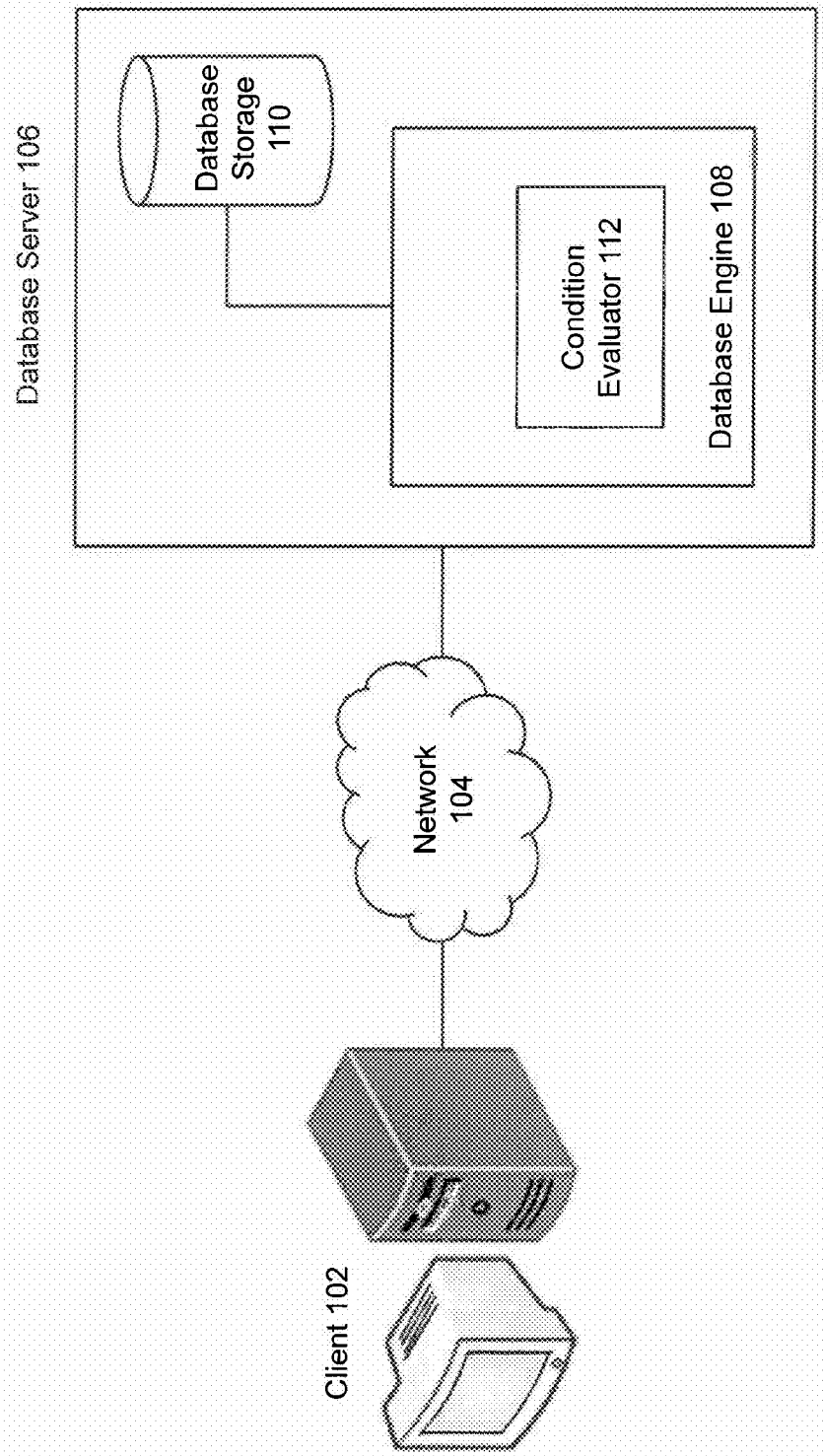
FIG. 1 is a block diagram of a database network, according to an example embodiment.

Provided herein are system, method and/or computer program product embodiments, and/or combinations and sub-combinations thereof, for accelerating database queries containing bitmap-based conditions.

A condition in a query can be a simple condition or a. complex condition. In accordance with an embodiment, a condition consistent with the conventions used in the Structured Query Language ("SQL") is called a predicate, although this example is provided solely for purposes of illustration and not limitation. A simple condition (e.g., a simple predicate) involves only one condition without any AND or OR operators. (E.g., table1.col1<100.) A complex condition (e.g., a complex predicate) can combine two or more simple conditions using AND/OR operators. (E.g., col1<100 AND col2>1000.)

The term simple "negated condition" refers to a negation applied to a simple condition. As a purely illustrative example, consider the expression:

$$\text{col1 NOT IN (10,100)} \quad (1)$$

$$\text{col2} \diamond 5000 \quad (2)$$

$$\text{col3 NOT LIKE '\% abc \%'} \quad (3)$$

Referring to Example 1 above, "col1 NOT IN (10,100)" is the negation of "col1 IN (10,100)".

The term "conjunction" refers to two or more conditions connected by AND operators. As a purely illustrative example, consider the expression:

$$t.x<10 \text{ AND } t.\text{priority}='\text{high}' \text{ AND } t.\text{state}='NY' \quad (4)$$

The term "conjunct" (or "conjunctive condition") refers to one of the conditions within a conjunction. Referring to Example 4 above, "t.state='NY'" is a conjunct.

The term "disjunction" refers to two or more conditions connected by OR operators. As a purely illustrative example, consider the expression:

$$t.x<5 \text{ OR } t.\text{priority}='\text{high}' \text{ OR } t.\text{state}='FL' \quad (5)$$

The term "disjunct" (or "disjunctive condition") refers to one of the conditions within a disjunction. Referring to Example 5 above, "t.state='FL'" is a disjunct.

Conditions within either a conjunction or a disjunction may be simple conditions (as in both of the above examples), or they may be complex conditions as shown in Example 4 below.

$$t.x>7 \text{ AND}(t.\text{priority}='\text{high}' \text{ OR } t.\text{state}\neq'\text{ME}') \quad (6)$$

Example 6 includes a conjunction where the second conjunct is itself a disjunction. In this example, the disjunct "t.state≠'ME'" is a negated condition. Similarly, in Example 7 shown below, the second conjunct is a disjunction, and the second disjunct within the disjunction is itself a conjunction.

$$t.x>7 \text{ AND}(t.\text{state}\neq'\text{GA}' \text{ OR } (t.\text{city}='\text{Midland}' \text{ AND } t.\text{state}\neq'\text{TX}')) \quad (7)$$

The term "selectivity" refers to an estimate of the number of rows which will satisfy a condition, and is usually expressed as a percentage of total rows in a table.

FIG. 1 depicts a database network 100, according to an example embodiment. The database network 100 can include a client system 102, a network 104, and a database server 106. The database server 106 can include a database engine 108 and database storage 110.

Client system 102 can be operable to send a request for data, commonly in the form of a database query, to database server 106 over network 104. Database server 106 can reply to the request by sending a set of results, for example, in the form of result rows from a database table, to client system 102 over network 104. One skilled in the relevant arts will appreciate that any data format operable to convey a request for data and a reply to the request may be used. In accordance with an embodiment, the requests and replies can be consistent with the conventions used in the Structured Query Language ("SQL"), although this example is provided solely for purposes of illustration and not limitation.

Network 104 can optionally be either a public or private communications network. In accordance with an embodiment, network 104 can be the Internet. In accordance with an additional embodiment, network 104 can be a private intranet, such as a corporate network. Network 104 can be any other form of wired or wireless network.

When a request for data, such as a query, is received by database server 106, it can be handled by database engine 108, in accordance with an embodiment. Database engine 108 can be operable to determine the data requested by the query, obtain the data, and provide a reply to the query. One skilled in the relevant arts will appreciate that while database engine 108 is illustrated as a single module in database network 100, database engine 108 may be implemented in a number of ways in order to accomplish the same function, including separating each of the aforementioned operations performed by database engine 108 into individual modules. Accordingly, the illustration of modules in database server 106 is not a limitation on the implementation of database server 106.

Database engine 108 can be operable to obtain the data in response to the query from database storage 110, in accordance with an embodiment. Database storage 110 can store values of a database in a data structure. In accordance with an embodiment, database values can be stored in a table data structure, the table having data rows and columns. At the intersection of each row and column is a data cell, the data cell having access to a data value corresponding to the associated row and column. Each column, in accordance with an embodiment, has an associated data type, such as "string" or "integer," which can be used by database engine 108 and client system 102 to interpret data contained in a data cell corresponding to the column. In accordance with an embodiment, the database storage 110 can comprise multiple tables. In an embodiment, database engine 108 can further include condition evaluator 112. The operation of condition evaluator 112 is described further below.

Additionally, database storage 110 can comprise alternate means of indexing data (e.g., bitmap) stored in a table of a database, in accordance with an embodiment. Database engine 108 can be operable to analyze a query to determine whether an available alternate means is useful to optimally access the data stored in a table, and then depending on the result of the analysis utilizes this alternate means to obtain data from the table, in accordance with an embodiment. The present embodiments include using such an alternate means of indexing data stored in a database table, although one skilled in the relevant arts will appreciate that alternate means of invoking the algorithms disclosed herein in order to access data within a database are within the scope of the present disclosure.

Figure 2:
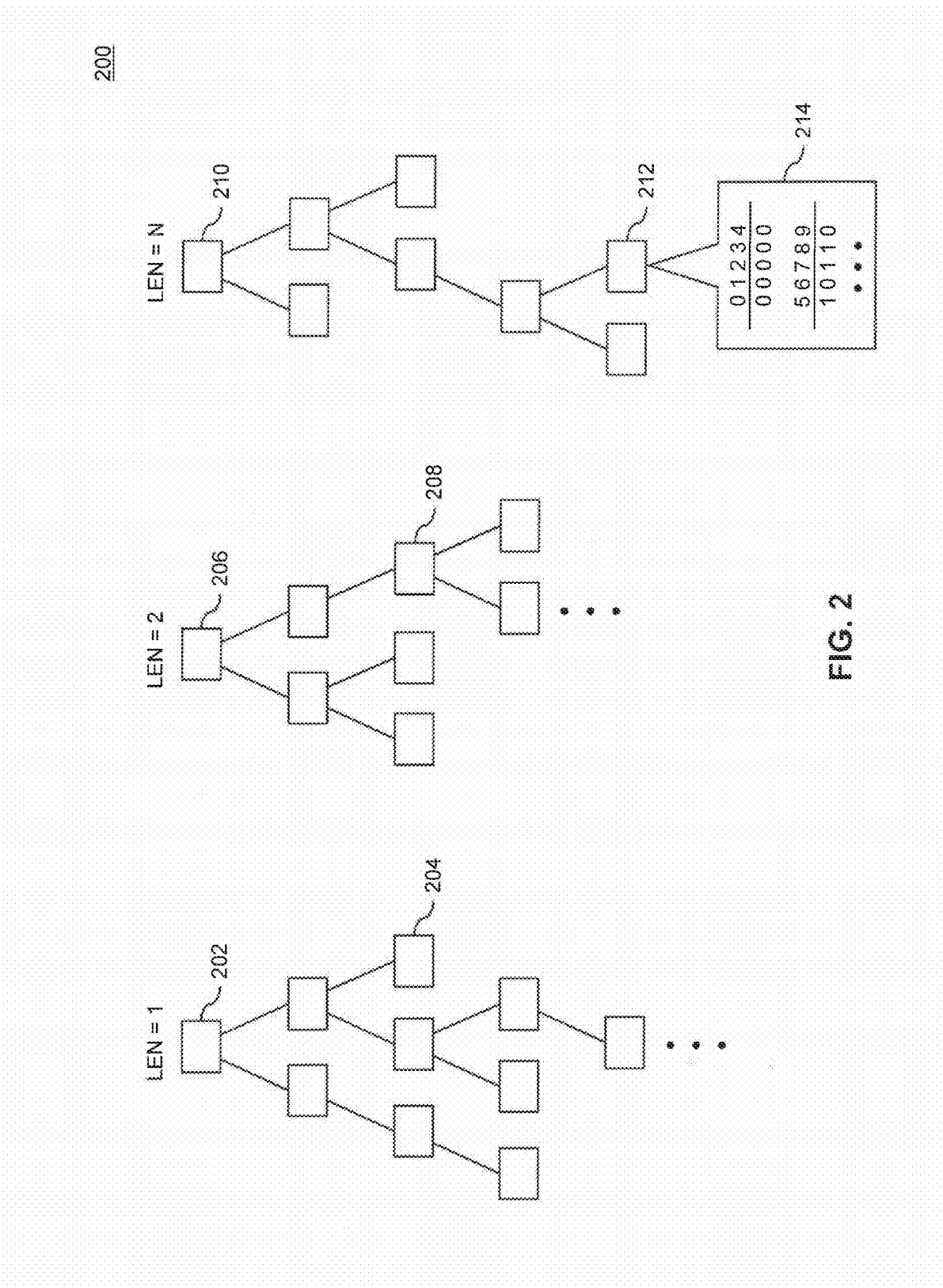
FIG. 2 illustrates a data structure used to provide an alternate means of indexing data in a database table, according to an example embodiment.

FIG. 2 depicts a data structure 200 used to provide an alternate means of indexing data in a database table, according to an example embodiment. Data structure 200 is depicted as a binary search tree ("BST"), but one skilled in the relevant arts will appreciate that the present disclosure can be optionally implemented with the use of other types of tree structures, as well as other types of non-tree data structures.

Data structure 200 can include a number of individual trees, each originating from a separate root node, such as root nodes 202, 206, and 210. Each tree also has leaf nodes, such as nodes 204, 208, and 212. Data structure 200 can be traversed by database engine 108, in accordance with an embodiment, in order to locate a node corresponding to a data value in a query. Each node can identify rows in a database table for which a particular column of that row (i.e., a cell) contains the requested value. For example, if database engine 108 receives a query for the data in each row where the value of "column A" is LIKE "Sybase" in a table, database engine 108 is operable to retrieve a data structure, such as data structure 200, corresponding to "column A", and is then further operable to traverse the data structure in order to locate a node which contains the string "Sybase" somewhere in that column, in accordance with an embodiment. The located node includes information identifying the specific rows in the table where the value of "column A" is LIKE "Sybase", thereby eliminating the need for database engine 108 to traverse each row of the table in order to compare the entries of "column A".

In accordance with an embodiment, each node can comprise a bitmap 214. The bitmap 214, an example of which is shown in FIG. 2, is an array of bits wherein each bit of the bitmap is associated with a row of a table. The individual bits of the bitmap are toggled between '0' and '1' to indicate whether or not a particular row satisfies the condition associated with the node in which bitmap 214 is located, in accordance with an embodiment. For the purposes of example, a bit having a value of '0' is used to indicate that the node condition is not satisfied for the associated row, and a bit having a value of '1' is used to indicate that the node condition is satisfied for the associated row, but one skilled in the relevant arts will appreciate that the alternate condition or other convention may be used.

Each individual tree structure in the above example can be generated by choosing a range of string lengths, such as 1 through 8, and generating nodes in the tree corresponding to each possible combination of strings of length 1 through 8 which occur in a particular data column associated with data structure 200. For example, root node 210 is the root of a tree where each node is associated with a string of length N. In the case where N is 8, a node, such as leaf node 212, is generated for each 8-character set occurring in the cell of the data column associated with data structure 200. Accordingly, in the case of two rows (and therefore two such cells in the associated column), where the first cell contains the text "the quick brown fox" and the second cell contains the text "jumped over the lazy dog", a node would be associated with each of the following strings:

"the quic"; "he quick"; "e quick "; "quick b"; "quick br"; "uick bro"; "ick brow"; "ck brown"; "k brown "; "brown f"; "brown fo"; "rown fox"; "jumped o"; "umped ov"; "mped ove"; "ped over"; "ed over "; "d over t"; "over th"; "over the"; "ver the "; "er the l"; "r the la"; "the laz"; "the lazy"; "he lazy "; "e lazy d"; "lazy do"; and "lazy dog".

As previously mentioned, each node can contain a bitmap 214. In this example, the bitmap would comprise two bits, one for each row in the instant database table. The first 12 substrings above, each associated with the first string (i.e., "the quick brown fox") would each have a bitmap of '10' (where a '1' indicates association with a row) indicating that the substring can he found in the first row, but not in the second, in accordance with an embodiment.

Returning to the previous example, if node 212 is associated with the condition whereby "column. A" contains the string "Sybase" (either as the entire string or as a component thereof), then bitmap 214 indicates that rows 3, 5, 7, and 8 each contain the string "Sybase" within the cell associated with "column A", in accordance with an embodiment. Accordingly, the query is rapidly resolved by returning only rows 3, 5, 7, and 8 as a result, without the need to retrieve and compare data in the remaining rows.

In an embodiment, condition evaluator 112 can reduce the cost of evaluating an expensive negated condition, which is enclosed within a conjunction or a disjunction within a bitmap-based environment. In an embodiment, such a cost reduction can be achieved using the following methods. One method, which is described in accordance with FIG. 3, can reduce the cost of evaluating expensive negated condition within a conjunction. Another method, which is described in accordance with FIG. 4, can reduce the cost of evaluating expensive negated condition within a disjunction.

Negated conditions can either be part of the user supplied query or can be synthetically generated for improved execution. For example, assume that a user supplied a query that includes the condition (o_orderkey>1). In this example, an optimizer can deduce that executing the condition (o$_{13}$ orderkey<=1) is faster than executing the original condition (o_orderkey>1) as it needs to review a very small portion of a tree based index to execute this condition (o_orderkey<=1) as compared to the original condition. Hence, the optimizer rewrites this condition simply as (NOT (o_orderkey<=1)). The NOT operation is carried out as a bitmap complement operation on the result of (o_orderkey<=1). The collective cost of executing the rewritten condition and the negation operation on its result is expected to be much less than the cost of executing the original condition (o_orderkey>1).

Figure 3:
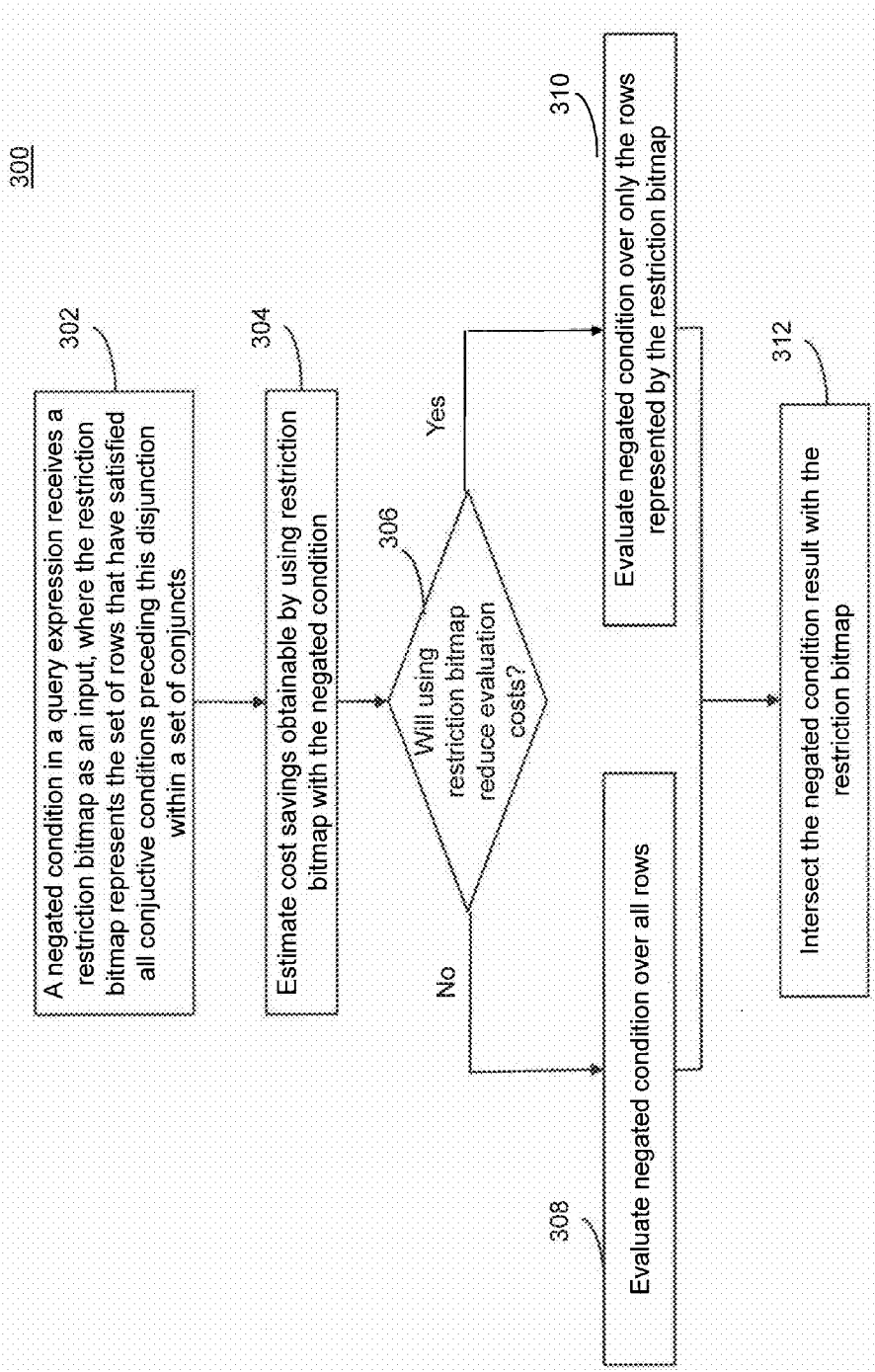
FIG. 3 is a flowchart illustrating an exemplary operation of a condition evaluator, according to an example embodiment.

FIG. 3 is a flowchart for method 300 illustrating an exemplary overall operation of condition evaluator 112, according to an embodiment. Method 300 can be performed by processing logic that can comprise hardware (e.g., circuitry, dedicated logic, programmable logic, microcode, etc.), software (e.g., instructions run on a processing device), or a combination thereof.

According to an example embodiment, one conjunct (i.e., one of a set of conditions connected by one or more AND operators) in a conjunction is a negated condition. According to this example, the negated condition may receive as an input a restriction bitmap. In an embodiment, a restriction bitmap represents a set of rows that have satisfied conjunctive conditions (i.e., a set of conditions connected by one or more AND operators) which preceded the negated condition within a set of conjuncts. The method of FIG. 3 can leverage knowledge that any rows which have not satisfied the preceding conjunctive condition(s) may not affect the final set of rows which will be delivered after the result of the negated condition has been combined conjunctively with results from the preceding conjunctive condition(s). When the cost of computing a simple negated condition is expected to be large, then restricting the scope of that simple condition's evaluation to the set of rows within the restriction bitmap can dramatically reduce the cost of evaluating that simple condition. In this way, the method of FIG. 3 implemented by condition evaluator 112, can achieve significant cost savings associated with query processing.

In an embodiment, as the method of FIG. 3 can typically have at least one additional bitmap operation to make use of the restriction bitmap, condition evaluator 112 can estimate the cost savings and compare the cost savings against the modest extra cost of an additional bitmap operation before deciding whether to apply this method. In an embodiment, this cost-based decision is made independently by condition evaluator 112 for each negated condition based on the condition, the available indexes, and the contents of the incoming restriction bitmap. According to one embodiment, the cost savings can include, for example, reduction in number of pages (from, for example, a column-store or any other data-structure) that are read, number of cells that are projected, conditions that are evaluated, their corresponding total costs, etc. that is achieved by restricting the scope of evaluating the negated condition to the set of rows within the restriction bitmap.

For example, consider the following illustrative and non-limiting example. In this example, a conjunction A AND NOT(B) is considered with a bitmap of 11001 for A (three out of five rows of the underlying table have been satisfied.) Assume that the result of executing B alone is 01111 and therefore, the result of executing NOT(B) (disregarding A's bitmap) is 10000. Therefore, the final result of A AND NOT(B) is evaluated as 11001 AND 10000 to be 10000. In contrast to this conventional method, the method of FIG. 3 will evaluate NOT(B) with consideration of the restriction bitmap associated with A. According to this example, B is only evaluated on the three rows qualified by A. Therefore, B is evaluated as 01001 and negation of B is evaluated as NOT(01001)=10110. The final result of A AND NOT(B) is evaluated as 11001 AND 10110 to be 10000. According to this example, by restricting the scope of that simple condition's evaluation to the set of rows within the restriction bitmap can dramatically reduce the cost of evaluating that simple condition, In step 302, for the negated condition, condition evaluator 112 can receive a restriction bitmap as an input, where the restriction bitmap represents the set of rows that have satisfied conjunctive conditions preceding the negated condition within a set of conjuncts. In step 304, for the negated condition, condition evaluator 112 estimates cost savings obtainable by using the restriction bitmap.

In step 306, condition evaluator 112 determines whether use of the restriction bitmap reduces evaluation costs. If use of the restriction bitmap reduces evaluation costs (step 306), condition evaluator 112 evaluates the negated condition over only the rows represented by the restriction bitmap (step 310). According to one example, evaluating the negated condition over only the rows represented by the restriction bitmap can include restricting evaluation of the condition to the set of rows represented by the bitmap before evaluating negation of the condition. If use of the restriction bitmap does not reduce evaluation costs, condition evaluator 112 evaluates the negated condition over all rows (step 308).

In step 312, condition evaluator 112 evaluates the intersection of the negated condition result with the restriction bitmap.

Figure 4:
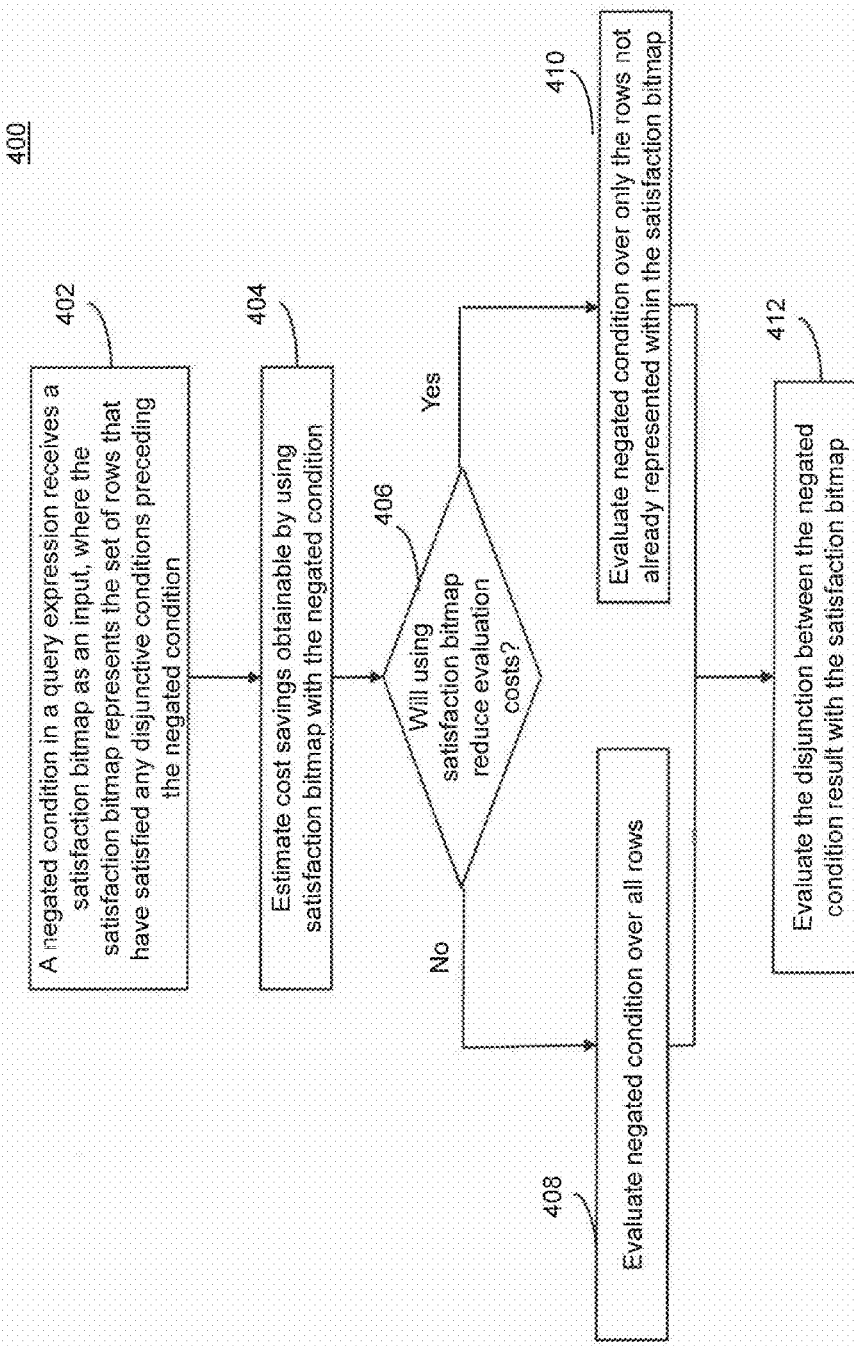
FIG. 4 is a flowchart illustrating an exemplary operation of a condition evaluator, according to an example embodiment.

FIG. 4 is a flowchart for method 400 illustrating an exemplary overall operation of condition evaluator 112, according to an embodiment. Method 400 can be performed by processing logic that can comprise hardware (e.g., circuitry, dedicated logic, programmable logic, microcode, etc.), software (e.g., instructions run on a processing device), or a combination thereof.

According to an example embodiment, one disjunct (i.e., one of a set of conditions connected by one or more OR operators) in a disjunction is a negated condition. According to this example, the negated condition may receive as an input a satisfaction bitmap. In an embodiment, a satisfaction bitmap represents a set of rows that have satisfied disjunctive conditions (i.e., a set of conditions connected by one or more OR operators) which preceded the negated condition. The method of FIG. 4 can leverage knowledge that any rows which have satisfied the preceding disjunctive conditions may not affect the final set of rows which will be delivered after the result of the negated condition has been combined disjunctively with results from preceding disjunctive conditions. When the cost of computing a simple negated condition is expected to be large, then restricting the scope of that simple condition's evaluation to the set of rows not satisfied in the satisfaction bitmap can dramatically reduce the cost of evaluating that simple condition. In this way, the method of FIG. 4 implemented by condition evaluator 112, can achieve significant cost savings associated with query processing.

In an embodiment, as the method of FIG. 4 can typically have at least one additional bitmap operation to make use of the satisfaction bitmap, condition evaluator 112 can estimate the cost savings and compare the cost savings against the modest extra cost of an additional bitmap operation before deciding whether to apply this method. In an embodiment, this cost-based decision is made independently by condition evaluator 112 for each negated condition based on the condition, the available indexes, and the contents of the incoming satisfaction bitmap. According to one embodiment, the cost savings can include, for example, reduction in number of pages (from, for example, a column-store or any other data-structure) that are read, number of cells that are projected, conditions that are evaluated, their corresponding total costs, etc. that is achieved by restricting the scope of evaluating the negated condition to the set of rows not satisfied in the satisfaction bitmap.

For example, consider the following non-limiting example. In this example, a disjunction A OR NOT(B) is considered with a bitmap of 11001 for A (three out of five rows of the underlying table have been satisfied.) Assume that the result of executing B alone is 01111 and therefore, the result of executing NOT(B) (disregarding A's bitmap) is 10000. Therefore, the final result of A OR NOT(B) is evaluated as 11001 OR 10000 to be 11001. In contrast to this conventional method, the method of FIG. 4 will evaluate NOT(B) with consideration of the satisfaction bitmap associated with A. According to this example, B is only evaluated on the two rows not satisfied by A. Therefore, B is evaluated as 00110 and negation of B is evaluated as NOT(00110)=11001. The final result of A OR NOT(B) is evaluated as 11001 OR 11001 to be 11001 as the final result. According to this example, by restricting the scope of that simple condition's evaluation to the set of rows within the satisfaction bitmap can dramatically reduce the cost of evaluating that simple condition.

In step 402, for the negated condition, condition evaluator 112 can receive a satisfaction bitmap as an input, where the satisfaction bitmap represents the set of rows that have satisfied any disjunctive conditions preceding the negated condition. In step 404, for the negated condition, condition evaluator 112 estimates cost savings obtainable by using the satisfaction bitmap.

In step 406, condition evaluator 112 determines whether use of the satisfaction bitmap reduces evaluation costs. If use of the satisfaction bitmap reduces evaluation costs (step 406), condition evaluator 112 evaluates the negated condition over only the rows not already represented within the satisfaction bitmap (step 410). According to one example, evaluating the negated condition over only the rows not already represented within the satisfaction bitmap can include restricting evaluation of the condition to the rows not already represented within the satisfaction bitmap before evaluating negation of the condition. According to one example, condition evaluator 112 can evaluate a complement of the satisfaction bitmap and therefore, in step 410, condition evaluator 112 can evaluate the negated condition over the rows represented within the complement of the satisfaction bitmap.

If the use of the satisfaction bitmap does not reduce evaluation costs, condition evaluator 112 evaluates the negated condition over all rows (step 408). In step 412, condition evaluator 112 evaluates the disjunction between the bitmap of the disjunct and the negated condition.

As another illustrative and non-limiting example, consider the following query:
WHERE
 (lineitem.1_quantity BETWEEN 26 AND 36)
 AND
  (1_lineitem.1_shipinstruct ◇ 'DELIVER IN PERSON'
  OR
  $1_{\_lineitem.}$1_shipmode NOT IN ('AIR' 'AIR REG'))

In this Example, condition (lineitem.1_quantity BETWEEN 26 AND 36) can be called P1; condition 1_lineitem.1_shipinstruct ◇ 'DELIVER IN PERSON' can be called P2; and condition $1_{\_lineitem.}$1_shipmode NOT IN ('AIR' 'AIR REG') can be called P3. Therefore, the query above can be summarized as P1 AND (NOT P2 OR NOT P3).

In a conventional method, executing this condition tree can include taking the original or transformed complex condition expression, and to render it into a tree of simple conditions (i.e. conditions which do not contain other conditions) and complex conditions (i.e. conditions containing one or more other conditions and one or more Boolean combining operators). This conventional method further includes evaluating each simple condition in isolation and then applying the simple binary combining operators to each pair of results from lower level conditions. In this example, the conventional method includes:
 Executing condition P1;
 Executing condition P2;
 Computing negation of the result of P2 (NOT P2);
 Executing condition P3;
 Computing negation of the result of P3 (NOT P3);
 Computing the disjunction: (NOT P2) OR (NOT P3); and
 Computing the conjunction P1 AND ((NOT P2) OR (NOT P3)).

In contrast to the conventional method, the methods of FIGS. 3 and 4 will:
 Execute condition P1 first;
 Execute the condition P2 only on the rows satisfied by condition. P1;
 Compute the negation of result of P2 (to get NOT P2);
 Execute the condition P3 only on the rows satisfied by condition P1;
 Compute the negation of result of P3 (to get NOT P3);
 Compute the disjunction; (NOT P2) OR (NOT P3); and
 Compute the conjunction P1 AND ((NOT P2) OR (NOT P3)).

Figure 5:
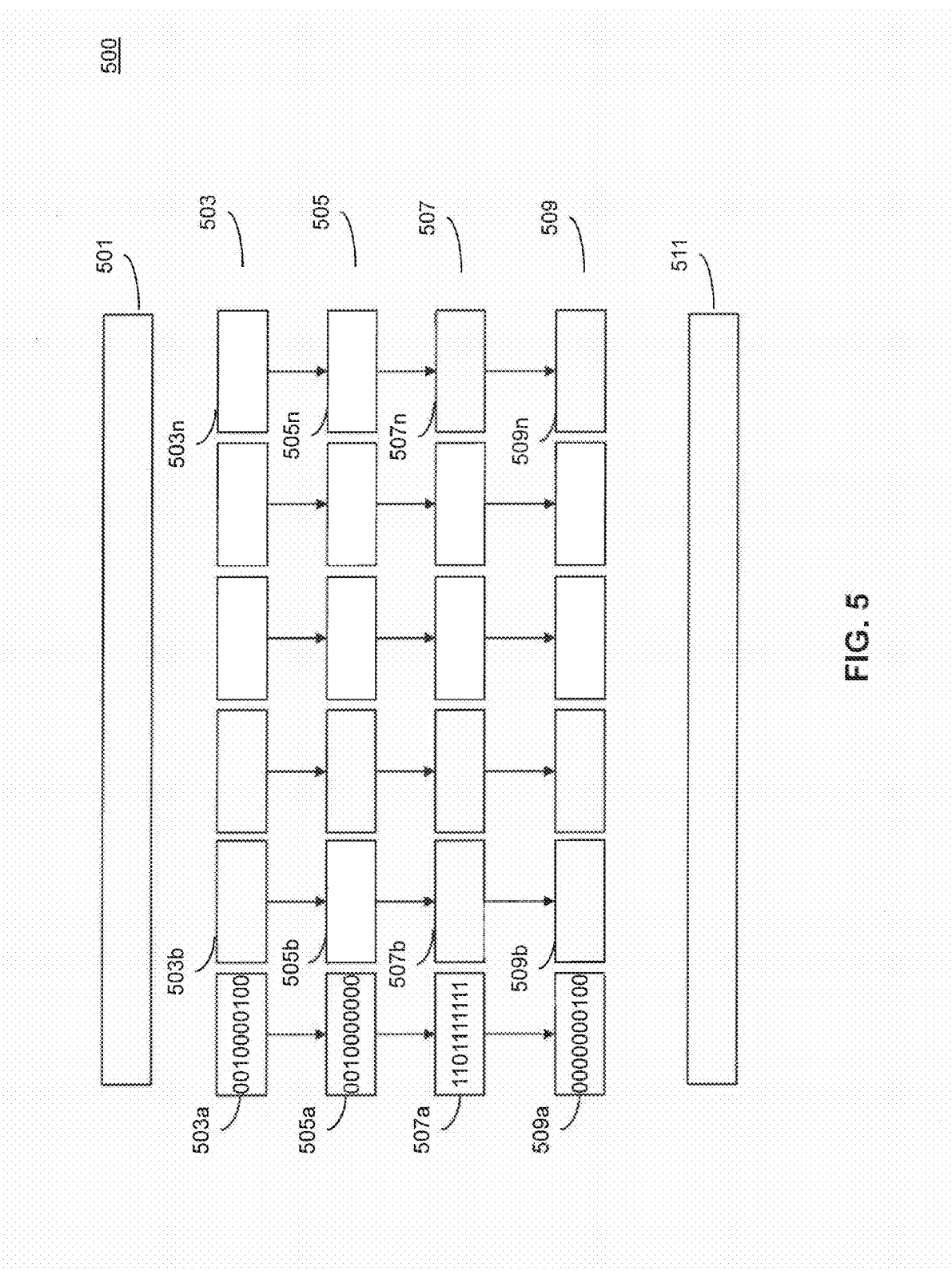
FIG. 5 is processing structure illustrating an exemplary operation of a condition evaluator, according to an embodiment

Assuming in this example that condition P1 is satisfied by only 0.1% of rows in the lineitem table (i.e, 0.99% rows are rejected by this condition), the conditions P2 and P3 can be executed on only 0.1% of rows, thereby reducing the cost of steps of executing conditions P2 and P3 above greatly. With this method and its restriction bitmap, condition P2 nd P3 need only be evaluated against 0.1% of the cells in the column, thereby reducing the number of cells projected, condition evaluations, and their corresponding total costs by a factor of 1000. In some cases, depending on the distribution of the bits within the restriction bitmap, this method may also reduce the number of pages from the column-store that will need to be read to project the subject cells, FIG. 5 depicts a processing structure 500 illustrating an exemplary overall operation of condition evaluator 112, according to an embodiment; Processing structure 500 can be performed by processing logic that can comprise hardware (e.g., circuitry, dedicated logic, programmable logic, microcode, etc.), software (e.g., instructions run on a processing device), or a combination thereof. According to one example, processing structure 500 can be executed on database server 106, database engine 108, condition evaluator 112, and/or a combination thereof.

In an embodiment, before method 300 of FIG. 3 and/or method 400 of FIG. 4 are performed, the conditions are first broken into small work-units, one thread performs method 300 of FIG. 3 and/or method 400 of FIG. 4 on its corresponding work-unit in parallel with other threads performing these methods on their respective work-units, and at the end, the results from all threads are combined. According to one example, the threads that evaluate conditions on the work-units are processes executed on database server 106, database engine 108, condition evaluator 112, and/or a combination thereof.

For example, consider the following illustrative and non-limiting example. In this example, the conjunction A AND NOT(B) is considered. In a conventional method, condition A can be evaluated in parallel by dividing the total row-set associated with condition A into small work-units. Each work-unit will include a range of rows on which the conditions will be evaluated. According to this conventional method, multiple threads execute the condition A on each work unit in parallel and then the result bitmap of each work-unit are merged to make a final bitmap for condition A. After evaluating A, same process is performed to evaluate condition B. The negation of the result of condition B is computed as NOT(B). At the end, the result bitmaps of A and NOT(B) are intersected as A AND NOT(B). According to this conventional method, condition A's bitmap is not used in evaluating condition. NOT(B). Also, in this conventional method, the bitmap results of work-units (obtained due to parallel execution of the conditions) are combined (e.g., merged) two times, once for condition A and once for condition B. Further, in this conventional method, the negation is performed in serial, after the result of condition B is evaluated by merging the results of each work-unit.

According to the exemplary embodiment of process 500 of FIG. 5, which is further discussed below with respect to method of FIG. 6, the total row-set associated with condition A, 501, is divided into small work-units 503a-503n (collectively 503). Each work-unit is a set of rows in the overall total rows. These work-units are disjoint that there is no common row between any of the work-units and merging all the work-units will result in the total rows. Multiple threads are used to evaluate condition A in parallel. Each thread of the multiple thread executes one work-unit of work-units 503 on the set of rows included in that work-unit. As an illustrative and non-limiting example, the total rows are assumed to be row #1 to row #100, and they are divided into 10 work units. The first work-unit being [1-11], second work unit being [11-20], etc. A first thread evaluates work-unit 503a to determine a restriction bitmap as [0010000100].

After executing each work-unit, the executed work-unit is used as a restriction bitmap (or a satisfaction bitmap in case of a disjunction) for evaluating condition B. According to the example of FIG. 5, the same thread that executed condition A on work-unit 503a, uses the restriction bitmap of work-unit 503a to evaluate condition B in 505a. In this example, since the calculated bitmap for work-unit 503a is [0010000100], that thread evaluates B only on rows 3 and 8 (rows that have been satisfied.) In this illustrative and non-limiting example, B is executed as [0010000000]. In next step, the negation of B is calculated by the same thread and in the same range of rows in the work-unit. In this illustrative and non-limiting example, NOT(B) is executed as [1101111111], 507a. The same thread then conjuncts the results of A and NOT(B) in in the same range of rows in the work-unit. In this illustrative and non-limiting example, A AND NOT(B) is executed as [0010000000], 509a. At the end, a simple merge combines the result bitmaps computed from the execution of each work-unit, where the work-units were executed in parallel using multiple threads.

According to this exemplary embodiment, for each work-unit and its associated thread, the restriction bitmap of that work-unit is used to evaluate the negated condition, as discussed in, for example, method 300 of FIG. 3. Although the exemplary embodiment of FIG. 5 is illustrated with a conjunction, one skilled in the relevant arts will appreciate that the embodiment of FIG. 5 is not limited to this example and the method of FIG. 4 in accordance with a disjunction can also be applied. Also, according to the exemplary embodiment of FIG. 5, the negation is performed in parallel on each work-unit and using different threads (one thread for each work-unit) Similarly, the conjunction is performed in parallel on each work-unit and using different threads, before all the results of the conjunction are merged.

Figure 6:
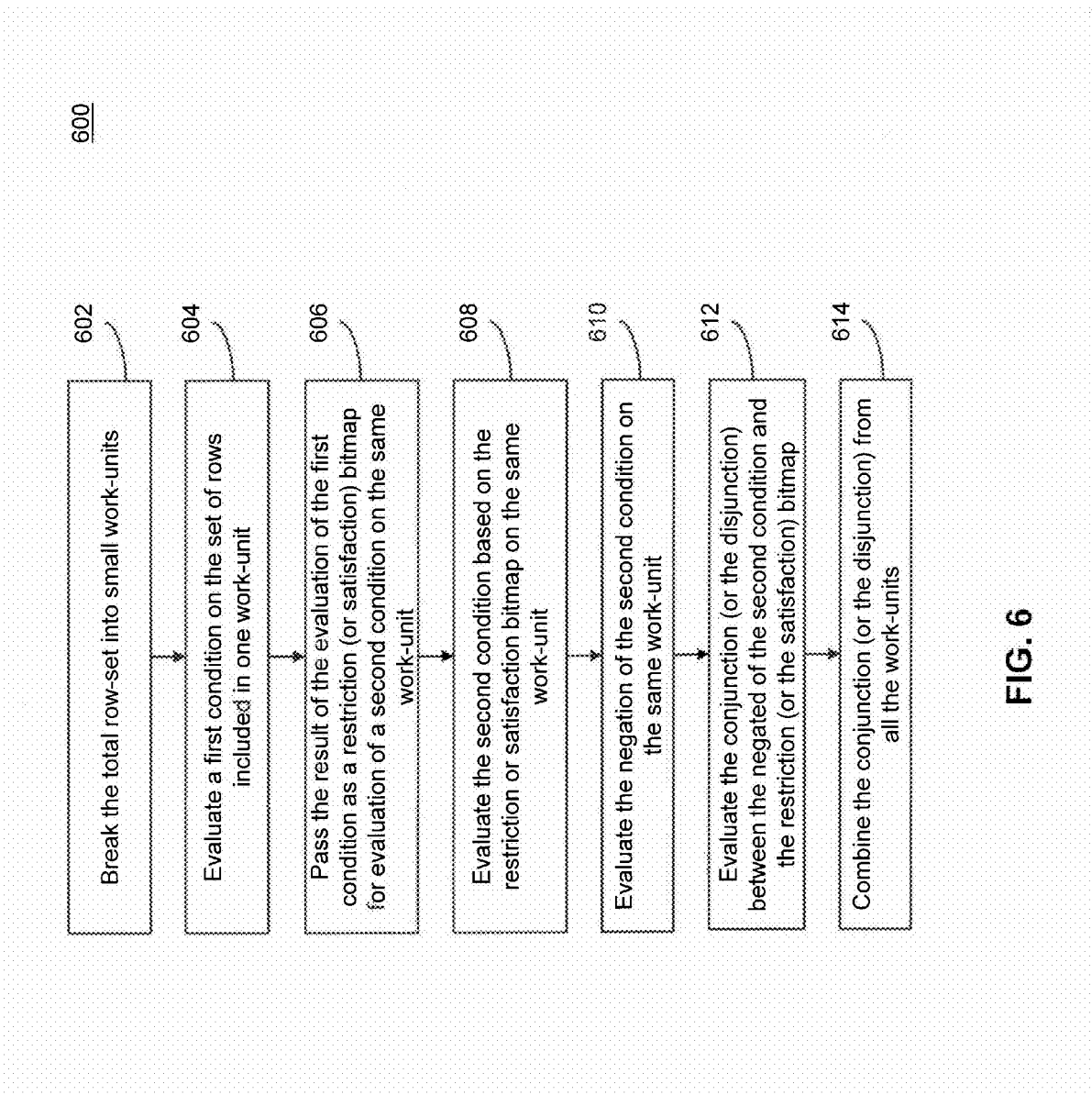
FIG. 6 is a flowchart illustrating an exemplary operation of a condition evaluator, according to an embodiment.

FIG. 6 is a flowchart for method 600 illustrating an exemplary overall operation of condition evaluator 112, according to an embodiment. Method 600 can be performed by processing logic that can comprise hardware (e.g., circuitry, dedicated logic, programmable logic, microcode, etc.), software (e.g., instructions run on a processing device), or a combination thereof.

In step 602, database server 106, database engine 108, condition evaluator 112, and/or a combination thereof, can divide the total row-set, on which each condition is evaluated, into small work-units. In one example, this division can occur based on the amount of execution that needs to be done, the number of available processors, the number of available threads, etc. In step 604, database server 106, database engine 108, condition evaluator 112, and/or a combination thereof can evaluate a first condition on the set of rows included in on work-unit. One thread takes a work-unit and executes the first condition on the set of rows included in that work-unit.

In step 606, condition evaluator 112 (as one example) can receive the result of the evaluation of the first condition as a restriction (or satisfaction) bitmap to evaluate the second condition on the same work-unit. In one example, in step 608, the same thread in the same range of rows in the work-unit uses the restriction (or satisfaction) bitmap to evaluate the second condition. If the first and second conditions are conjuncted, in step 608, the method 300 of FIG. 3 is used to restrict the evaluation of the second condition only on the rows represented by the restriction bitmap provided in step 606. Alternatively, if the first and second conditions are disjuncted, in step 608, the method 400 of FIG. 4 is used to restrict the evaluation of the second condition only on the rows not represented within the satisfaction bitmap provided in step 606.

In step 610, condition evaluator 112 (as one example) evaluates the negation of the second condition by, for example, using the same thread in the same range of rows in the work-unit. In step 612, condition evaluator 112 (as one example) conjuncts (or disjuncts, depending on the original connection between the first and second conditions) the executed first condition and the negated second condition. In step 614, condition evaluator 112 (as one example), combines (e.g., merges) the results from all the work-units that were performed in parallel.

Although the exemplary embodiments are illustrated with one conjunction and/or one disjunction, one skilled in the relevant arts will appreciate that the embodiments for reducing the cost of evaluating an expensive negated condition, which is enclosed within a conjunction or a disjunction within a bitmap-based environment is not limited to these exemplary embodiments. According to one embodiment, one or more negated conditions can be within a combination of one or more conjunctions and/or disjunctions. For example, the embodiments disclosed herein can be used when one or more negated conditions are conditions within a disjunction where the entire disjunction is combined conjunctively with other selective conditions and/or are conditions within a disjunction where earlier disjunctive conditions were relatively nonselective, as discussed in U.S. patent application Ser. No. 12/892,312, entitled "Accelerating Database Queries Containing Bitmap-Based Conditions," which is incorporated by reference herein in its entirety.

Figure 7:
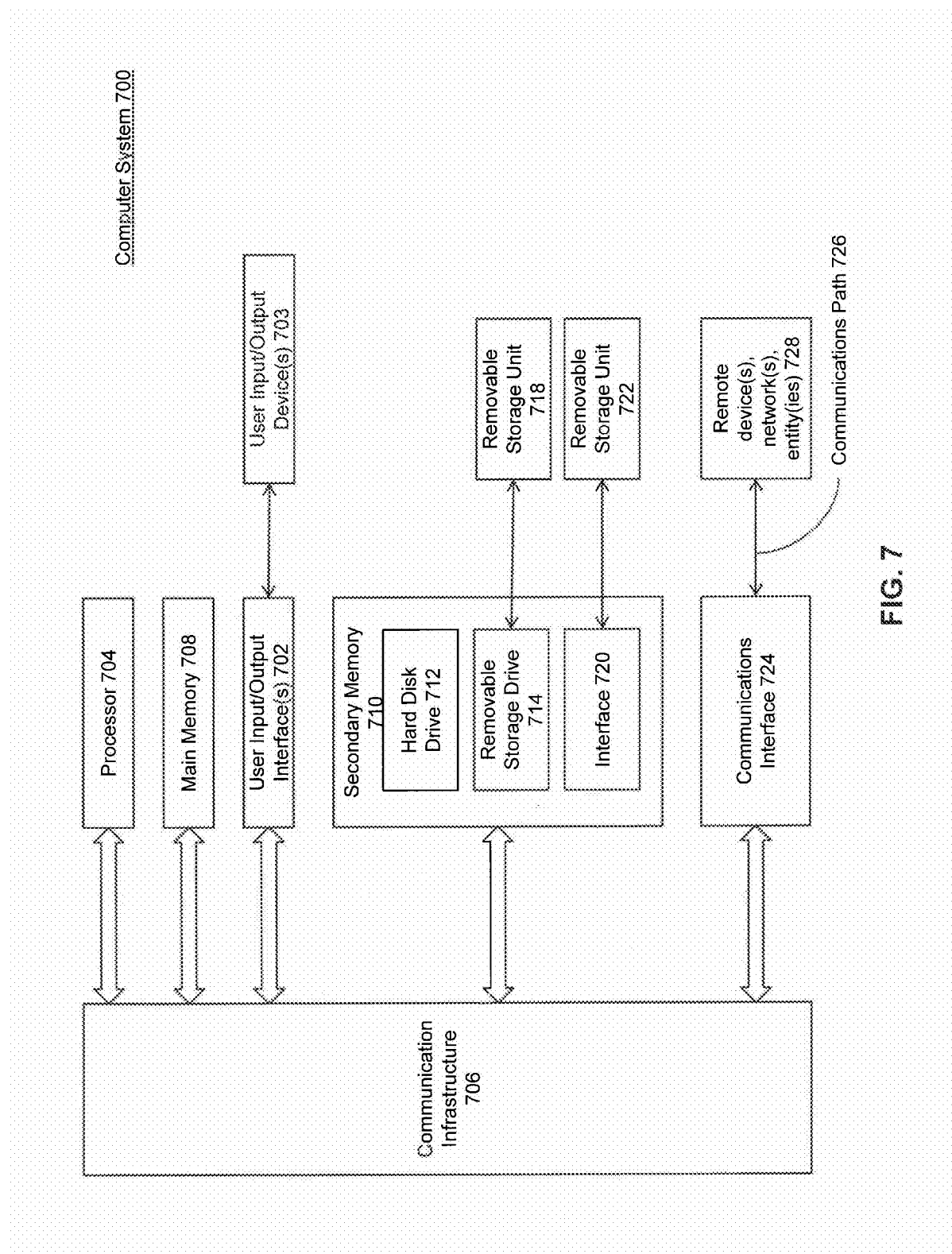
FIG. 7 is an example computer system useful for implementing various embodiments.

Various embodiments can be implemented, for example, using one or more well-known computer systems, such as computer system 700 shown in FIG. 7. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, a tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments using data processing devices, computer systems and/or computer architectures other than that Shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method comprising:
   rewriting, by a processor, a condition as a negated condition based on a determination that a collective cost of the rewriting and a negation operation is less than a cost of executing the condition;
   determining, by the processor, a bitmap, wherein the bitmap represents a set of rows that have satisfied a conjunct that precedes the negated condition in a query expression, wherein the conjunct is a condition within a conjunction; and
   restricting, by the processor, evaluation of the negated condition to the set of rows represented by the bitmap.

2. The method of claim 1, further comprising:
   determining a cost saving based on the restricting; and
   comparing, before performing the restricting, the cost saving against a cost of an additional bitmap operation.

3. The method of claim 1, wherein the negated condition is a negation of a second condition, the restricting further comprising:
   restricting evaluation of the second condition to the set of rows represented by the bitmap before evaluating the negated condition.

4. The method of claim 1, wherein the determining the bitmap comprises:
   dividing a total set of rows, on which the bitmap is determined, into a plurality of work-units; and
   determining a respective bitmap on each one of the plurality of work-units.

5. The method of claim 4, wherein the restricting evaluation of the negated condition further comprises restricting evaluation of the negated condition to a set of rows represented by the respective bitmap on each one of the plurality of work-units.

6. The method of claim 5, further comprising:
   producing a respective final bitmap result on each one of the plurality of work-units by intersecting the respective bitmap of the conjunct and the negated condition on each one of the plurality of work-units; and
   combining the respective final bitmap results to produce a final bitmap result.

7. A system, comprising:
   a memory; and
   at least one processor coupled to the memory and configured to:
   rewrite a condition as a negated condition based on a determination that a collective cost of the rewriting and a negation operation is less than a cost of executing the condition;
   determine, a bitmap, wherein the bitmap represents a set of rows that have satisfied a conjunct that precedes the negated condition in a query expression, wherein the conjunct is a condition within a conjunction; and
   restrict evaluation of the negated condition to the set of rows represented by the bitmap.

8. The system of claim 7, the at least one processor further configured to:
   determine a cost saving based on the restricting; and
   compare, before performing the restricting, the cost saving against a cost of an additional bitmap operation.

9. The system of claim 7, wherein the negated condition is a negation of a second condition, and wherein to restrict evaluation the at least one processor is configured to:
   restrict evaluation of the second condition to the set of rows represented by the bitmap before evaluating the negated condition.

10. A non-transitory tangible computer-readable device having instructions stored thereon that, when executed by at least one computing device, causes the at least one computing device to perform operations comprising:
    rewriting a condition as a negated condition based on a determination that a collective cost of the rewriting and a negation operation is less than a cost of executing the condition;
    determining a bitmap, wherein the bitmap represents a set of rows that have satisfied a conjunct that precedes the negated condition in a query expression, wherein the conjunct is a condition within a conjunction; and
    restricting evaluation of the negated condition to the set of rows represented by the bitmap.

11. The non-transitory computer-readable device of claim 10, the operations further comprising:
    determining a cost saving based on the restricting;
    comparing, before performing the restricting, the cost saving against a cost of an additional bitmap operation; and
    producing a final bitmap result by intersecting the bitmap of the conjunct and the negated condition after performing the restricting.

12. A computer implemented method comprising:
    rewriting, by a processor, a condition as a negated condition based on a determination that a collective cost of the rewriting and a negation operation is less than a cost of executing the condition;
    determining, by the processor, a satisfaction bitmap, wherein the satisfaction bitmap represents result of a disjunct that precedes the negated condition in a query expression, wherein the disjunct is a condition within a disjunction; and
    restricting, by the processor, evaluation of the negated condition to a set of rows that are not within the determined satisfaction bitmap.

13. The method of claim 12, further comprising:
    determining a cost saving based on the restricting; and comparing, before performing the restricting, the cost saving against a cost of an additional bitmap operation.

14. The method of claim 12, wherein the negated condition is a negation of a second condition, the restricting further comprising:

restricting evaluation of the second condition to the set of rows that are not within the determined satisfaction bitmap before evaluating the negated condition.

15. The method of claim 12, wherein the determining the satisfaction bitmap comprises:

dividing a total set of rows, on which the satisfaction bitmap is determined, into a plurality of work-units; and determining a respective satisfaction bitmap on each one of the plurality of work-units.

16. The method of claim 15, wherein the restricting evaluation of the negated condition further comprises restricting evaluation of the negated condition to a set of rows that are not within respective satisfaction bitmap on each one of the plurality of work-units.

17. The method of claim 16, further comprising:

producing a respective final bitmap result on each one of the plurality of work-units by performing disjunction between the respective bitmap of the disjunct and the negated condition on each one of the plurality of work-units; and combining the respective final bitmap results to produce a final bitmap result.

18. A system, comprising:

a memory; and at least one processor coupled to the memory and configured to:

rewrite a condition as a negated condition based on a determination that a collective cost of the rewriting and a negation operation is less than a cost of executing the condition;

determine a satisfaction bitmap, wherein the satisfaction bitmap represents result of a disjunct that precedes the negated condition in a query expression, wherein the disjunct is a condition within a disjunction; and restrict evaluation of the negated condition to a set of rows that are not within the determined satisfaction bitmap.

19. The system of claim 18, the at least one processor further configured to:

determine a cost saving based on the restricting;

compare, before performing the restricting, the cost saving against a cost of an additional bitmap operation; and produce a final bitmap result by performing disjunction between the bitmap of the disjunct and the negated condition after performing the restricting.

20. A non-transitory computer-readable device having instructions stored thereon that, when executed by at least one computing device, causes the at least one computing device to perform operations comprising:

rewriting a condition as a negated condition based on a determination that a collective cost of the rewriting and a negation operation is less than a cost of executing the condition;

determining a satisfaction bitmap, wherein the satisfaction bitmap represents result of a disjunct that precedes the negated condition in a query expression, wherein the disjunct is a condition within a disjunction; and restricting evaluation of the negated condition to a set of rows that are not within the determined satisfaction bitmap.

* * * * *